United States Patent
Angel et al.

(10) Patent No.: US 11,934,740 B2
(45) Date of Patent: *Mar. 19, 2024

(54) AUDIO ASSOCIATING OF COMPUTING DEVICES

(71) Applicant: Amazon Technologies, Inc., Seattle, WA (US)

(72) Inventors: Justin-Josef Angel, San Francisco, CA (US); Eric Alan Breitbard, Oakland, CA (US); Sean Robert Ryan, Sausalito, CA (US); Robert Steven Murdock, Fairfax, CA (US); Michael Douglas McQueen, San Francisco, CA (US); Ryan Charles Chase, Pacifica, CA (US); Colin Neil Swann, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 497 days.

This patent is subject to a terminal disclaimer.

(21) Appl. No.: 16/536,659

(22) Filed: Aug. 9, 2019

(65) Prior Publication Data

US 2020/0034114 A1 Jan. 30, 2020

Related U.S. Application Data

(63) Continuation of application No. 14/869,405, filed on Sep. 29, 2015, now Pat. No. 10,379,808.

(51) Int. Cl.
| G06F 3/16 | (2006.01) |
| G06F 3/14 | (2006.01) |
| G10L 15/22 | (2006.01) |
| G10L 25/54 | (2013.01) |

(52) U.S. Cl.
CPC ............ *G06F 3/167* (2013.01); *G06F 3/1407* (2013.01); *G06F 3/1454* (2013.01); *G10L 15/22* (2013.01); *G10L 25/54* (2013.01); *G10L 2015/223* (2013.01)

(58) Field of Classification Search
CPC ...... G06F 3/167; G06F 3/1407; G06F 3/1454; G10L 15/22; G10L 25/54; G10L 2015/223
USPC .......................................................... 704/275
See application file for complete search history.

(56) References Cited

U.S. PATENT DOCUMENTS

| 8,380,999 B1 * | 2/2013 | Robison ............ H04W 52/0274 |
| | | 320/120 |
| 8,509,734 B1 * | 8/2013 | Gupta .................. G06Q 20/405 |
| | | 455/406 |
| 8,634,848 B1 * | 1/2014 | Bozarth ................ G01S 5/0284 |
| | | 455/456.1 |
| 10,002,611 B1 * | 6/2018 | Typrin .................... H04L 51/10 |
| 10,212,110 B2 * | 2/2019 | Lee ........................ H04L 65/765 |

(Continued)

*Primary Examiner* — Thuykhanh Le
(74) *Attorney, Agent, or Firm* — Pierce Atwood LLP

(57) ABSTRACT

Methods, systems and apparatus for associating electronic devices together based on received audio commands are described. Methods for associating an audio-controlled device with a physically separate display screen device such that information responses can then be provided in both audio and graphic formats using the two devices in conjunction with each other are described. The audio-controlled device can receive audio commands that can be analyzed to determine the author, which can then be used to further streamline the association operation.

21 Claims, 11 Drawing Sheets

(56) References Cited

U.S. PATENT DOCUMENTS

| | | | |
|---|---|---|---|
| 2007/0047719 A1* | 3/2007 | Dhawan | G06F 3/167 379/235 |
| 2008/0051120 A1* | 2/2008 | Vieri | H04M 7/0024 455/412.2 |
| 2011/0099157 A1* | 4/2011 | LeBeau | H04N 21/25875 704/235 |
| 2011/0246204 A1* | 10/2011 | Chen | G06F 16/58 704/E21.001 |
| 2013/0125212 A1* | 5/2013 | Lee | H04N 21/43637 726/4 |
| 2013/0204967 A1* | 8/2013 | Seo | H04L 67/327 709/217 |
| 2013/0252594 A1* | 9/2013 | Faillaci | G06Q 90/00 455/414.2 |
| 2013/0321390 A1* | 12/2013 | Latta | G06T 19/006 704/E21.001 |
| 2013/0328878 A1* | 12/2013 | Stahl | G09G 5/005 345/1.3 |
| 2014/0095996 A1* | 4/2014 | Hogben | G06T 11/60 715/716 |
| 2014/0163954 A1* | 6/2014 | Joshi | G06F 3/0237 704/9 |
| 2014/0278438 A1* | 9/2014 | Hart | G06F 3/167 704/275 |
| 2014/0333509 A1* | 11/2014 | Yuann | G06F 1/1694 345/2.1 |
| 2015/0032809 A1* | 1/2015 | Xie | H04L 65/1083 709/204 |
| 2015/0070250 A1* | 3/2015 | Chang | H04N 21/4223 345/2.3 |
| 2015/0154976 A1* | 6/2015 | Mutagi | G06F 3/167 704/275 |
| 2015/0169284 A1* | 6/2015 | Quast | G06F 16/9535 704/275 |
| 2015/0243283 A1* | 8/2015 | Halash | G10L 15/19 704/246 |
| 2015/0256973 A1* | 9/2015 | Raounak | H04W 12/069 726/7 |
| 2015/0269936 A1* | 9/2015 | Alameh | H04L 51/52 726/28 |
| 2015/0271177 A1* | 9/2015 | Mun | H04L 63/0853 726/7 |
| 2016/0050263 A1* | 2/2016 | Hwang | H04N 21/234363 709/204 |
| 2016/0050326 A1* | 2/2016 | Lee | H04N 21/64322 358/402 |
| 2016/0063956 A1* | 3/2016 | Andolina | G06F 3/1446 345/2.3 |
| 2016/0078430 A1* | 3/2016 | Douglas | G06Q 30/0185 705/43 |
| 2016/0118044 A1* | 4/2016 | Bondarev | G10L 15/26 704/235 |
| 2016/0119468 A1* | 4/2016 | Efrati | H04L 67/55 370/431 |
| 2016/0155442 A1* | 6/2016 | Kannan | G06F 3/167 704/275 |
| 2016/0155443 A1* | 6/2016 | Khan | G06F 3/167 704/275 |
| 2016/0231977 A1* | 8/2016 | Yamada | G06F 3/0482 |
| 2016/0266747 A1* | 9/2016 | Leatham | H04N 21/47202 |
| 2016/0301634 A1* | 10/2016 | Allen | H04L 51/214 |
| 2017/0178192 A1* | 6/2017 | Hirahara | G06Q 30/0277 |
| 2017/0223277 A1* | 8/2017 | Lunsford | H04N 23/62 |
| 2017/0264939 A1* | 9/2017 | Jang | G06F 3/167 |
| 2017/0324794 A1* | 11/2017 | Jeong | H04L 67/025 |
| 2018/0197009 A1* | 7/2018 | Severn | G09G 5/00 |
| 2018/0288598 A1* | 10/2018 | Putterman | H04W 4/025 |
| 2021/0233157 A1* | 7/2021 | Crutchfield, Jr. | G10L 15/22 |
| 2022/0208319 A1* | 6/2022 | Ansari | G16H 10/60 |

* cited by examiner

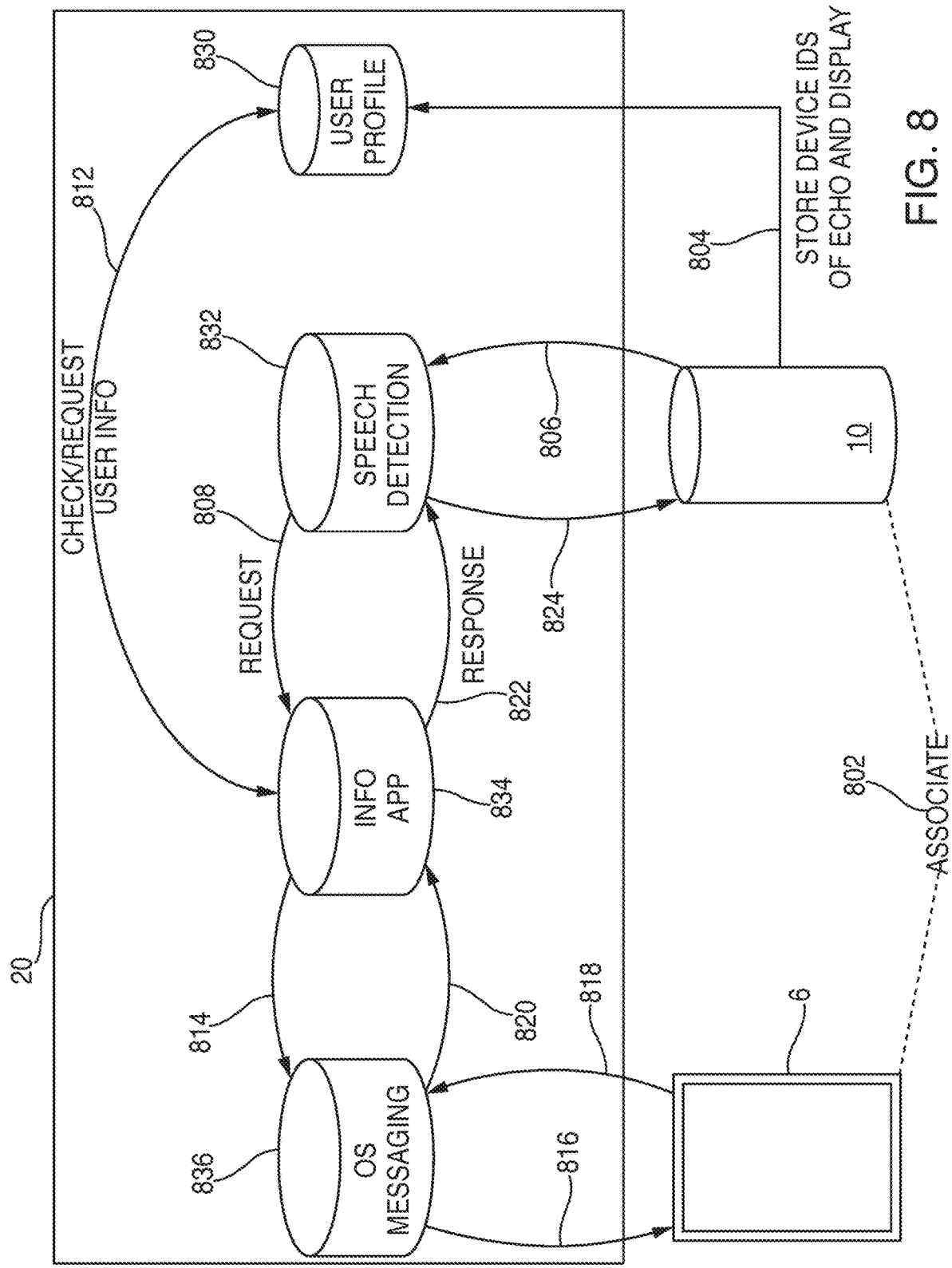

AUDIO ASSOCIATING OF COMPUTING DEVICES

CROSS REFERENCE TO RELATED APPLICATION

This application is a continuation of, and claims the benefit of priority of, U.S. Non-Provisional patent application Ser. No. 14/869,405, filed Sep. 29, 2015 and titled "AUDIO ASSOCIATING OF COMPUTING DEVICES", scheduled to issue as U.S. Pat. No. 10,379,808. The contents of which is expressly incorporated herein by reference in its entirety.

BACKGROUND

Each passing day, more and more consumers utilize computing devices to find out information on a variety of subjects. Some of these computing devices are portable, such as smart phones and tablet computers, while others are intended to remain somewhat fixed in a given location, such as desktop computers, smart TVs, etc. In addition, an increasing numbers of consumers are utilizing internet access devices that communicate with consumers via voice commands, such as the Amazon Echo. When using an Echo, a user simply speaks a wakeword word to start the process, such as "Alexa, what's the weather going to be this afternoon?" (where "Alexa" is the wakeword word). The Echo accesses one or more databases to figure out what was requested and how to respond, and then, in this example, provide the local weather for the upcoming afternoon as an audio message.

Devices like the Echo are increasingly useful to provide users with quick and easy access to information. Sometimes, however, it might be even more helpful if the user could be provided with a graphic response, either as a complement to the audio response, or as a replacement. For example, after getting the afternoon weather forecast, the user might want to see the upcoming five-day forecast, something that might be difficult or somewhat time consuming to present as an audio message.

BRIEF DESCRIPTION OF DRAWINGS

FIG. 8 is an illustrative schematic diagram of a system for associating a voice-activated computing device with a smart screen computing device in accordance with embodiments of the present disclosure.

DETAILED DESCRIPTION

Figure 1A:
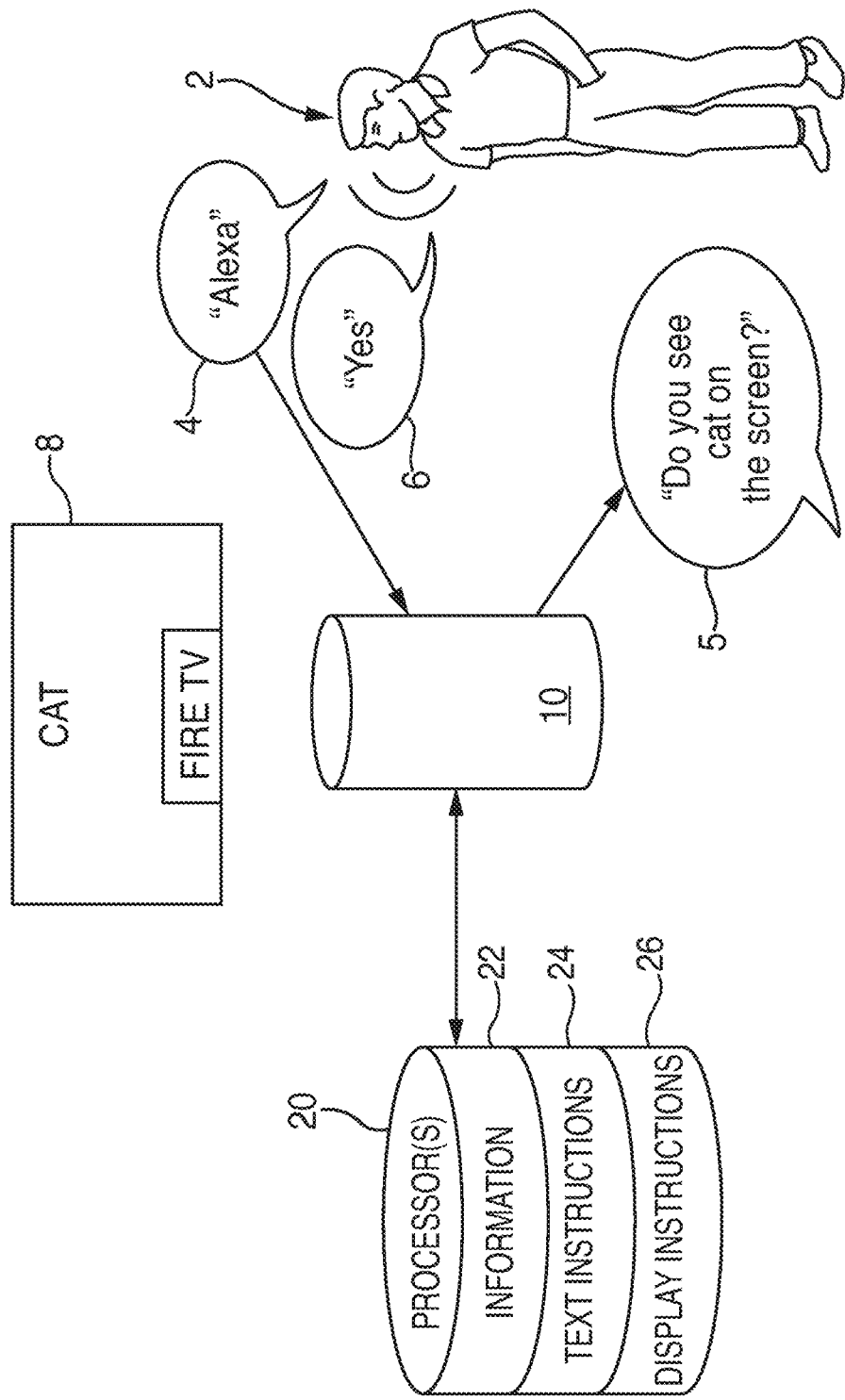
FIGS. 1A and 1B are illustrative schematic diagrams of a user interacting with a voice-activated computing device in accordance with embodiments of the present disclosure.

The present disclosure, as set forth below, is directed to various embodiments of systems, methods and apparatus for enabling an audio-controlled computing device to be associated with the display screen of a "smart" computing device such that the answers to information requests made to the audio-controlled device can be presented in whole or in part on the associated display screen device. There are a variety of audio-controlled devices which may be used in conjunction with the embodiments disclosed herein, such as the Amazon Echo™ and the Amazon Fire TV. Such devices receive audio inputs, process those inputs and then respond accordingly. The association process, in accordance with embodiments disclosed herein, utilizes voice commands and displayed information to enable the user to provide the inputs necessary for the association process via audio commands. The displayed information may include words, phrases and/or graphic images that an individual can identify by speaking out loud to help designate which screen should be used. For example, if a given user account has two different display screen devices associated with it, the association process can cause an image of two different animals (e.g., a horse on one screen and a cat on the other) to be displayed, one animal on each screen. The individual then speaks the name of the animal displayed on the desired screen, the audio-controlled device receives the spoken word via one or more microphones therein, and then transforms the spoken word into audio data. The audio data is sent to the back-end system that coordinate the flow of content to the individual based on requests received by the audio-controlled device.

The process by which the back-end system selects a particular display from a list of displays that are related to a given user account can vary. For example, a given user account can have a list of display screen devices associated with that account. The user can prioritize the list manually, in which case the back-end system can simply select the displays from the list in order and await confirmation from the individual. If the first display is not confirmed in a given amount of time (e.g., by the receipt of the displayed words or message), the next display on the list can be selected and a new confirmation message can be sent for display on that display screen device. Alternatively, or additionally, the back end system could cause different words or messages to be displayed on each display screen device in the list of display screen devices for the currently logged in user and await the receipt of audio data representing one of those words or messages. Another manner in which the selection of a particular display screen device can occur in accordance with the disclosure herein is that the back-end system can monitor which display screen devices are selected and used over time, and adjustments to the priority of each display screen device can be varied as the individual's preferences are learned.

When a display screen device is selected as the particular display screen device from the list of display screen devices for the logged-in individual, the back-end system can determine which operating system is associated with the selected display screen device. Once the operating system is determined, the back-end system can then determine the appropriate third-party messaging system to use to provide the words or message to the particular display screen device using a push notification protocol of that operating system. For example, if the particular display screen device was a Fire TV, then the instructions to cause the word or message to be displayed on the Fire TV would be sent to the Amazon Device Messaging server (ADM), while an Apple iPhone display screen device would require that instructions be sent to the Apple Push Notification Service (APNS), and an Android display screen device would require instructions be sent to the Google Cloud Messaging server (GCM) (or whichever third-party service was appropriate for a given display screen device). In this manner, the back-end system can be configured to work with virtually any display screen device because the actual instructions to the display screen device to display the given word(s) or message are provided by the third party associated with particular display screen device using a push notification protocol.

In some embodiments, the association process can be made to be almost transparent to the user, whereby the user initiates the process and, after a request for confirmation by the audio-controlled device, a smart display screen device is semi-automatically associated with the audio-controlled device. In circumstances such as these, the system can rely on previously provided information, such as the type of information that might be stored in an individual a user's account, to semi-automatically configure the audio-controlled device with the display screen device of, for example, the smart phone of the registered user. Once the initiation process is started by the user, the audio-controlled device could set up a temporary link with the display screen of the user's mobile phone, send a confirmation message, and listen for an audio confirmation command from the user. Once the command was received, the association could be completed.

In accordance with some embodiments, once the audio-controlled device has been activated, the device can be operated in an audio-only mode until a request is made that could benefit from the use of a graphic response, either as supplement to or as a replacement for the audio response. In either case, in order to communicate with a display screen device, the audio-controlled device could detect whether any smart display screen device are local. For example, the audio-controlled device could attempt to communicate with any smart display screen devices it can find using a low-powered signal such as Bluetooth, or by using near field communications (NFC) protocols. If one or more display devices are detected, the audio-controlled device can communicate with the user to see if the user wants information displayed, as is appropriate. If the user elects to receive graphic communications, the audio-controlled device can cause individual messages to be sent to each of the display devices it detects by sending the information to the back-end system which can, in turn cause an inquiry to be sent to the user to identify orally, what is seen on the screen of the selected display device. Once a display screen device is selected by the user, the association process can be completed. In other instances, particularly when the selected display screen devices include high quality audio speakers, the selection of a display screen device may also result in a switch of which device the audio portion of the content is sent to. For example, a display screen might be coupled to a Fire TV that is configured up to provide audio output through a high quality stereo system or the like. In that case, when the audio-controlled device is associated with the Fire TV, all of the content will be provided through the Fire TV (e.g., to the coupled display screen and stereo) instead of just the graphics portion, while the audio-controlled device can still be utilized to listen for requests for content even though the content may all be provided to the individual user through another device. In that situation, the user may be under the impression that the audio-controlled device is providing the content directly to the particular display screen device, even though it is the back-end system that are receiving the requests for content from the audio-controlled device and providing the requested content through the particular display screen device and its speakers (if that is the selected method of content distribution).

In some embodiments, the audio-controlled device can inquire whether information should be shown on a display screen device, either to complement the audio response or to replace it (such decisions would likely be made by the audio-controlled device or by the back-end system that supports the device, in order to alleviate the user with having to make such decisions each time information is requested). If a display screen device is to be used, the audio-controlled device could send out communications, as described above, to see what display screen devices may be available locally. If any display screen devices are available locally, the audio-controlled device could next try to determine whether any of those display screen devices are already associated with the device, in which case one of the associated devices could automatically be selected based on a preset prioritization, or such a decision could be made based on whichever device was associated most recently, or other metrics as is appropriate. In any case, the user could be given the option of using a pre-selected or default display screen device, selecting and associating a new display screen device, or simply remaining in audio-only mode. Accordingly, the selection of the particular display device can be accomplished in a variety of different ways that can be based on: (i) options set by a user and stored in a user profile related to the user's login account; (ii) a default setting that can change over time automatically as system 20 records the choices in display screen device selection a user makes; (iii) a prioritization scheme based on screen types or sizes, such as always selecting the largest display from the list of display devices for a given user account, or always placing mobile phones at the bottom of the priority list since those devices typically have the smallest display screens; (iv) or any other combination that enhances the user's overall experience.

In still other embodiments, the audio-controlled device could receive an audio command from a user and, using speech detection processing via the back-end system, attempt to determine who the individual user is. If the back-end system are able to match the user with an individual profile for the user currently logged in to the audio-controlled device, the back-end system could communicate with the user through the audio-controlled device to verify whether the match is correct. If the user is correctly identified, the back-end system could then determine which display screen device, if any, the user prefers based on the user's profile. The device could them implement the selected association based on the user profile, or the back-end system could let the user know what is planned and seek permission to do so. If no users can be identified as being previously known, the back-end system could then return to the processes previously described to establish a new user profile with one or more display screen devices for graphic communications. Even if a user is identified through the use of speech detection routines, and that user already has a display screen device associated with her or her profile, the user may be provided with the option of selecting a different screen device, and then going through the association process described herein.

In some embodiments, various different combinations of the audio associating of an audio-controlled device described above may be utilized in accordance with the disclosures herein. The flow of information, system commands, user inquiries and responses to those inquiries can be somewhat complex. The audio-controlled device and back-end system can rely on locally stored information, but it is more likely to be controlled by remote applications that can interface with other remote applications, such as a speech detect application and a user profile application. In addition, there may be additional applications to interface with different mobile software platforms, such that output commands from the audio-controlled device can be provided in an efficient and timely manner (for example, it would do little good to have the graphic portion of a response be displayed 15 seconds after the textual version of the response has been provided).

FIG. 1A shows an illustrative schematic of a user 2 interacting with an audio-controlled device 10 (such as the Amazon Echo™), which is itself communicating with information 22 stored remotely on back-end system 20 (which includes, for example, one or more processors and or servers). Back-end system 20 may simply include a remote storage system, such as a cloud server, local-area-network (LAN) server and/or wide-area-network (WAN) server, which can include storage capacity as well as remote applications that can interface with and instruct the audio-controlled device 10. Back-end system 20 may include generally information 22, which may itself include instructions that can be provided to one or more users, such as text instructions 24 and display instructions 26. Information 22 may also include administrative information, such as whatever links may exist between various portions of text instructions 24 and display instructions 26. In the example shown in FIG. 1A, the user activates device 10 by saying an activation phrase such as "Alexa" as shown by balloon 4. This can occur as part of setting up device 10, where the user might register device 10 and associate device 10 with a user account, such as the user account for user 2. Back-end system 20, as part of that process, may be able to recognize that there are one or more displays present locally, such as television display 8 (which, in this case, can be a "smart" TV, such as a Fire TV). This can be accomplished in various ways. For example, device 10 could use Bluetooth signals to identify Bluetooth-enabled displays that are present locally and provide that information to back-end system 20; or, in the instance where display 8 is a touch-screen device that includes GPS circuitry and display 8 is in communication with back-end system 20, back-end system 20 could inform device 10 when such displays are locally present. Moreover, device 10 and/or back-end system 20 could maintain a database of all of the displays a given user utilizes, in which case, additional information may also be compiled to provide a better overall experience to the user, such as: keeping track of the size and quality of each display and defaulting to the highest quality display; determining whether the display also includes one or more speakers as well as an indication of the quality of those speakers (some or all of which may be used to select a default display to be associated with device 10).

Accordingly, as part of the setup process, device 10 can cause display 8 to display a word or words that can be used to pair device 10 with display 8. For example, FIG. 1A shows the word "CAT" on display 8, and device 10 can produce an audible message "Do you see cat on the screen?" as shown in balloon 5, to which user 2 can respond audibly "Yes" (as shown in balloon 6). Alternatively or additionally, device 10 can simply ask the user to read the word or phrase shown on the display, and then proceed accordingly as set forth below. In either instance, the audible response can be received by device 10, at which point the process continues to associate device 10 with display 8, as is described in more detail below. Once one or more displays 8 have been associated with device 10, the association process can be as simple as the user says the wake word (e.g., "Alexa"), followed by a specific, predefined phrase (e.g., "use a nearby screen") or any other way of determining an intent based on the user's spoken request. It should be noted that an intent may be something that a user invokes with their voice, such as "please use a display screen" as described above, or "please tell me today's weather." For example, in the previous discussion, when system 20 ultimately determines that a spoken request has been made by a user to use a screen to display content, system 20 has determined an intent, which may be accomplished by system 20 having a set of triggering association instructions that can be matched with individual intents. The triggering association instructions provide system 20 with the capability to match intents without requiring a specific one hundred percent match on the received audio data, which greatly increases the effectiveness of the system and the overall user experience.

As described herein, for example, the request to use a display could be accomplished by a user speaking an unlimited number of different combinations of words, such as "use display," "display please," "show me more," "show me what you mean," "can I see that," etc. Thus device 10 could provide the request to back-end system 20, as is described below in more detail (see, for example, FIG. 8 and the corresponding description), such that content is provided to the user through an appropriate manner using device 10 and/or the currently associated display 8.

Figure 1B:
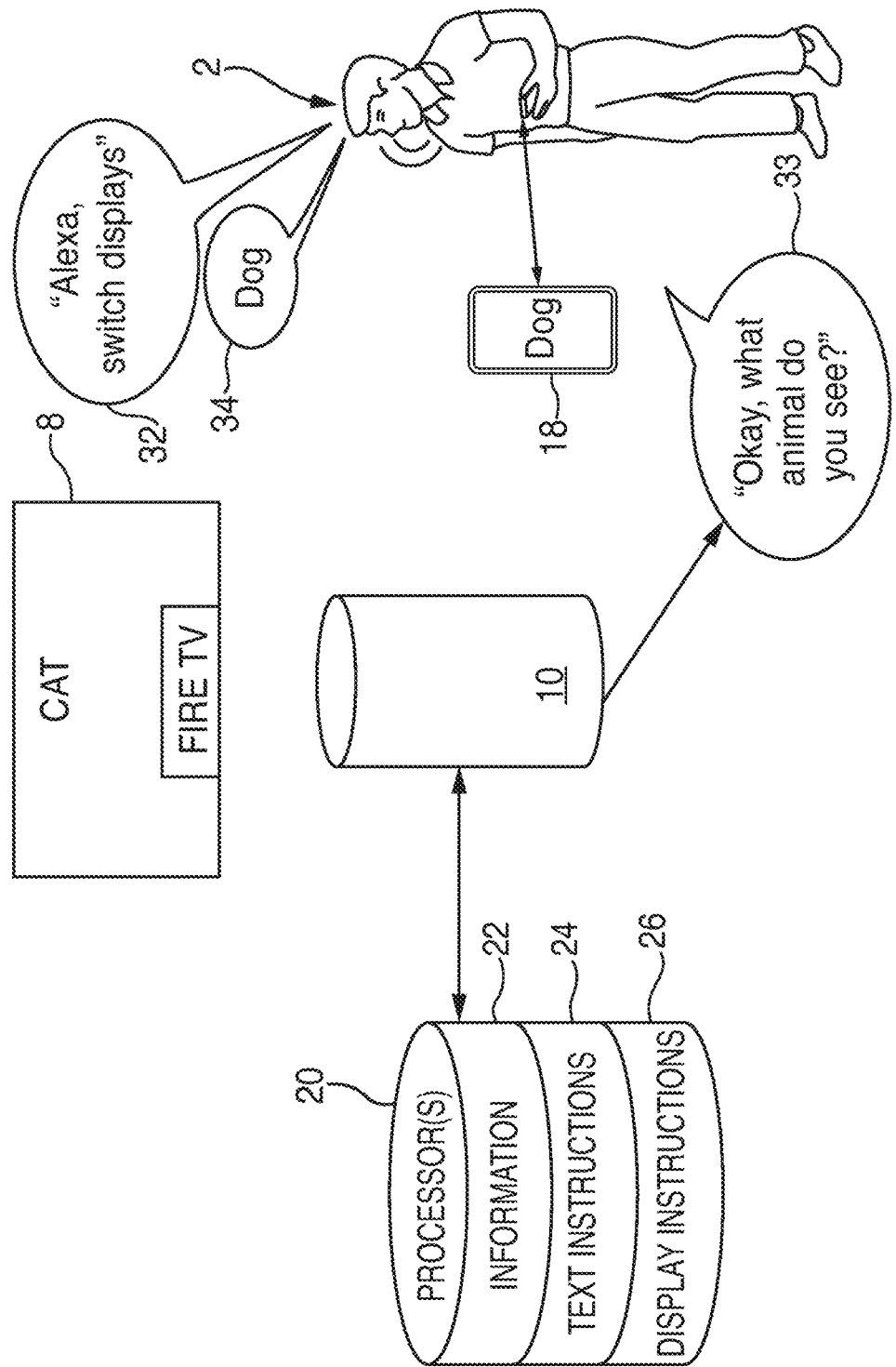

FIG. 1B shows an illustrative schematic of another embodiment in which user 2 switches the display with which it is receiving communications related to communications with device 10. As shown in FIG. 1B, in addition to display 8, a handheld "smart" display 18 is also available and can be recognized by device 10 (the recognition may, for example, occur through a Wi-Fi connection, a Bluetooth connection, a proprietary communications protocol, or other similar manners). User 2, through a series of audible communications, switches the display to which display instructions are provided in response to requests provided to device 10 (such as, for example, showing the current weather radar in response to an inquiry about the weather outside). User 2 starts the process by saying a wakeword word, such as "Alexa," followed by a command to switch display screen device, such as shown in balloon 32 "Alexa, switch displays." Device 10 receives the audible command as described more fully below and sends it to back-end system 20 which determines that the user wishes to switch the associated display screen device. Back-end system 20 can then can cause different words or word phrases to be displayed on the display screen devices it can locate locally and that it is capable of causing display instructions to be provided to (in fact, the instructions to display information are most likely to be provided to display 8 from back-end system 20 through the use of a push notification protocol based on the operating system associated with each display screen device and in coordination with any audio output provided by device 10).

In this case, back-end system 20 (or, alternatively, device 10 itself if it is configured as such) recognizes two display screen devices—display screen device 8 and display screen device 18, and displays a different animal on each display screen device (in this case, "CAT" on display screen device 8 and "Dog" on display screen device 18). Device 10 then provides an audible message, such as that shown in balloon 33, "Okay, what animal do you see?" In response to audible message 33, user 2 says out loud "Dog" (as shown in balloon 34), and device 10 receives that audible message, send it to back-end system 20, which processes it appropriately to determine that user 2 has requested that device 10 be associated with display screen device 18 instead of display screen device 8. Accordingly, in at least some embodiments, the association of device 10 with display screen device 8 is terminated and device 10 is instead associated with display 18. In other embodiments, back-end system 20 could cause the display instructions to be displayed on all locally recognizable display screen devices unless and until a user de-designates a given display screen device (for example, a user could block a display screen device from being associated with the audio-controlled device, and that selection would be stored in connection with the user's profile on back-end system 20).

Smart display device 18 may be a smart phone, such as an Amazon Fire phone or other similar computing device, or smart display device 18 may be a tablet computer such as the Fire Tablet HD or other similar device. Once the association information is provided to device 10, a variety of different options are available, all in accordance with the principles of the disclosure herein. For example, device 10 or system 20 could include a list of all of the smart display screen devices that have been "associated" with device 10 to attempt speed up the association process and/or the switching process in the future. The list could, alternatively or additionally, include a list of any devices related to a given user account which may have been purchased that back-end system 20 is aware of. For example, back-end system 20 may have been used by a given user account to purchase an iPhone™, in which case the physical address of that device (i.e., the MAC address) could already be known to back-end system 20 even before the new iPhone™ is delivered. In that instance, back-end system 20 could be prepared to associate the new iPhone™ with the audio-controlled device 10 in the user's house as soon as back-end system 20 is aware that the new device is "on-line" (which could, for example, occur when the user loads in a particular app, such as the Amazon mobile app). The list devices could, in some embodiments, include one or more prioritization schemes, depending on various factors. For example, there could be default prioritization schemes, such as associate displays in descending display size order. In another instance, back-end system 20 may utilize alternate schemes depending on what content is to be displayed, such as if the content is HD quality, the prioritization scheme resorts available displays by image quality instead of size. In other instances, the prioritization scheme might favor displays that also include speakers of a given threshold quality (e.g., smart phone speakers may not qualify). On the other hand, device 10 could be associated with whatever smart display screen was offered at the time instead of utilizing any prioritization scheme.

Figure 2:
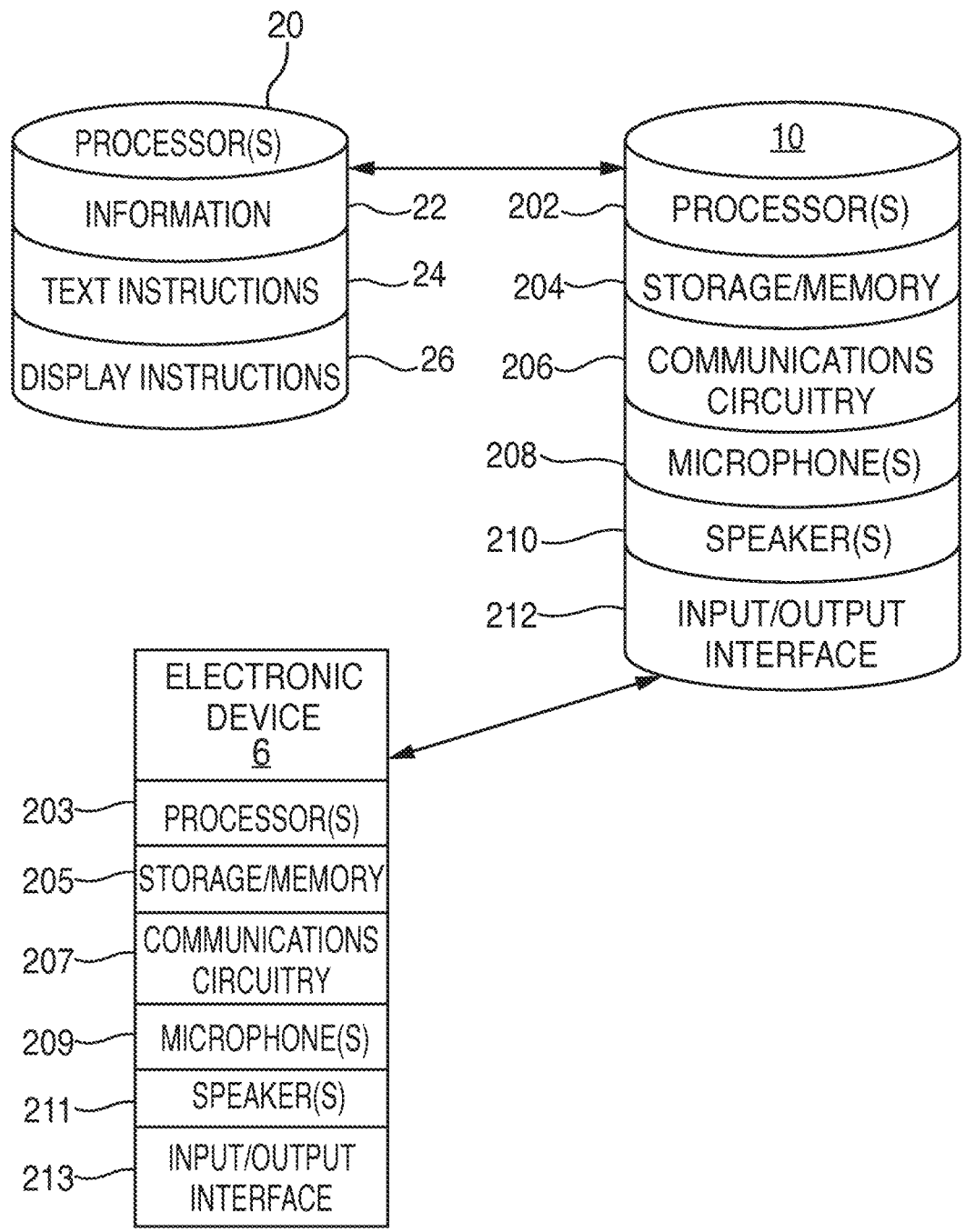
FIG. 2 shows a schematic block diagram of an illustrative environment for providing voice-requested information to users in accordance with embodiments of the present disclosure.

FIG. 2 shows a schematic block diagram of an illustrative environment for providing voice-requested information to users in accordance with embodiments of the present disclosure. FIG. 2 shows a more detailed view of some of the components audio-controlled device 10 may include, as well as communication paths for device 10 to communicate with system 20 (including information 22, text 24 and graphics 26) and electronic device 6 that includes a display screen device 6 (such as display screen device 18 of FIG. 1B). Audio-controlled device 10 may include a variety of components, such a processor(s) 202 (which may include a single processor, multiple processors, a single processor with multiple cores and/or multiple processors each having multiple cores without departing from the spirit of the embodiments disclosed herein). Device 10 also may include storage/memory 204, which can include one or more physical hard drives, one or more Flash solid-state drives (SSDs), or whatever other means of storing information in a manner in which it is readily accessible (such as an external hard drive connected to device 10 via a conventional high speed interface such as USB 2).

FIG. 2 also shows device 10 to include communications circuitry 206, which can include a variety of different circuits, such as Wi-Fi circuitry for wireless high-speed communications, Ethernet circuitry for hard-wired connections to a router, NFC circuitry for use in identifying display screens that are physically close by for associating operations, Bluetooth circuitry as an alternate communications method between device 10 and potential display screens, etc. Device 10 should also include one or more microphones 208 which can be used to listen for inputs from user 2, or anyone else who has the desire to interact with device 10. For example, device 10 may include an array of microphones 208 which can include omnidirectional and directional microphones arranged in a manner that enables device 10 to recognize which direction the audio commands are coming from to improve the quality and accuracy of the received far field audio signals. Device 10 also requires one or more speakers 210 to provide the audible output signals to user 2. Device 10 may also include the capability to be directly connected to a display screen via input/output interface 212, which could reduce, but not eliminate, the associating requirements described herein.

Electronic device 6, which includes a display screen such as display screen 18 as previously described, may also include one or more processors 203, storage/memory 205 (which may include memory such as Flash memory, RAM, an SSD, etc.), communications circuitry 207 (which may, for example, include cell communication circuitry, Wi-Fi circuitry, Bluetooth circuitry, etc.), one or more microphones 209 to receive audio inputs, one or more speakers 211 to provide audio outputs, and input/output interface 213, which can include combined or separate input and output circuitry.

Figure 3:
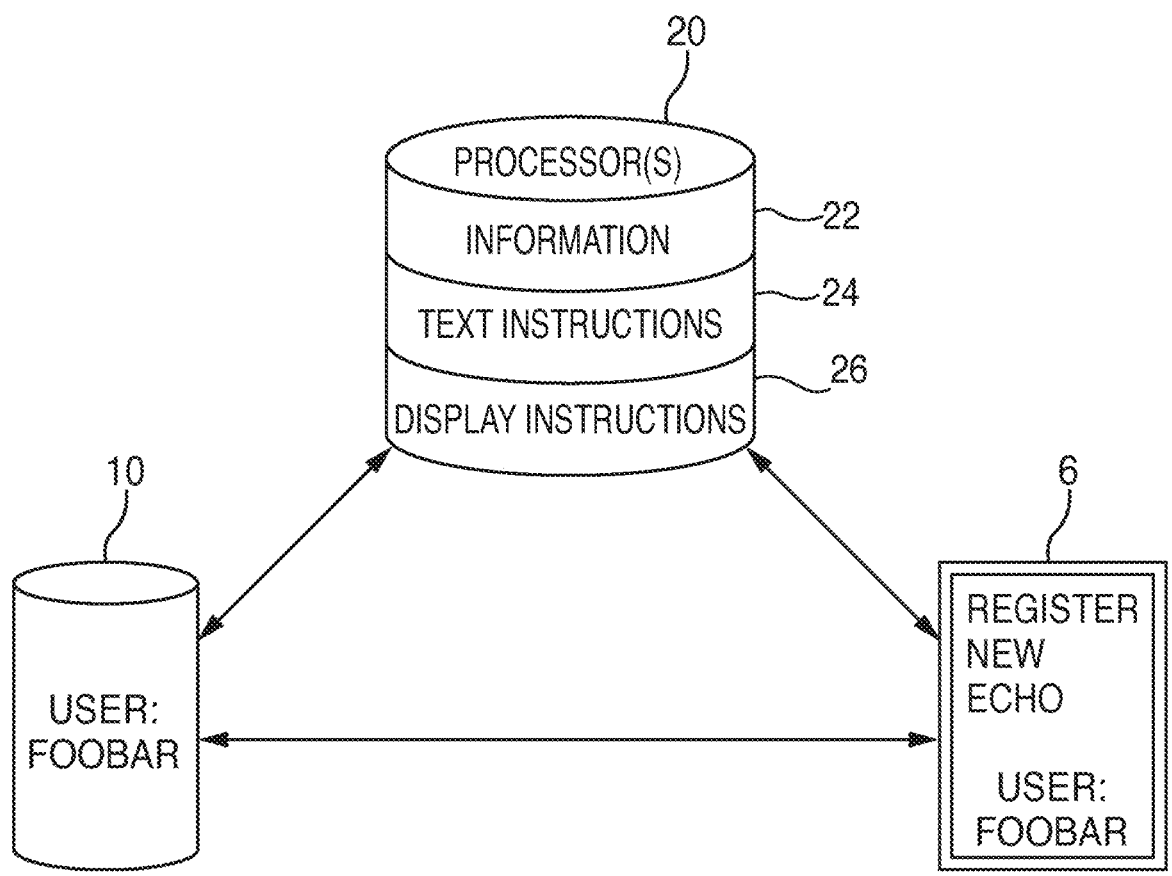
FIG. 3 shows an illustrative schematic block diagram that can be used to configure a new audio-controlled computing device in accordance with embodiments of the present disclosure.
Figure 4:
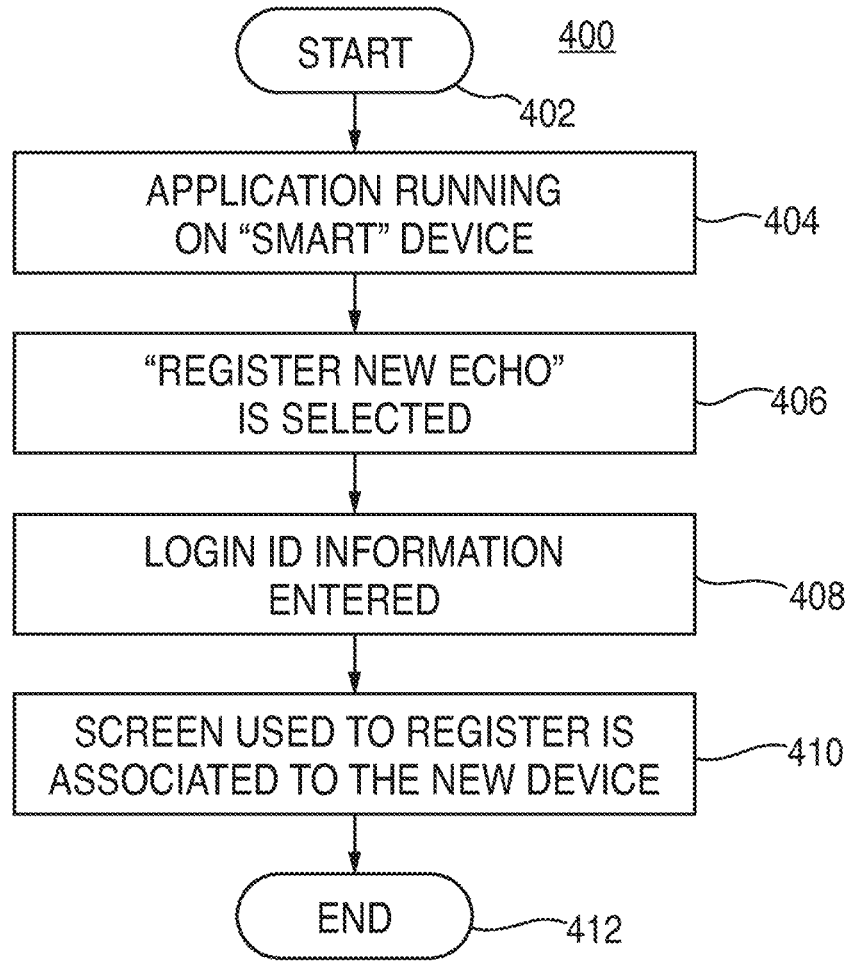
FIG. 4 is a flow diagram of a method of auto-associating a smart-screen with an audio-controlled computing device in accordance with embodiments of the present disclosure.

FIG. 3 shows an illustrative schematic that, in conjunction with the flow diagram shown in FIG. 4, may be used to describe a sample initiation process that enables a user to configure a newly acquired audio-controlled device 10. Audio-controlled device 10 can communicate with portable computing device 6 (which can be a mobile phone, table computer, or any other such computing device) as shown in FIG. 3 and described above (e.g., such as Bluetooth or NFC communications protocols). In addition, computing device 6 may communicate with back-end system 20 to provide the information required to configure a new device 10, such as the establishment of a user profile on system 20, configuring settings and preferences for user 2. Back-end system 20 may also communicate directly with device 10 as described above. One example of a process for configuring a new device 10 is shown in FIG. 4, such that a given USER ID (in this case "FOOBAR") is registered on both computing device 6 and audio-controlled device 10. In fact, while it may appear to the user that device 10 is communicating directly with computing device 6, in at least some embodiments, back-end system 20 interfaces with both computing device 6 and audio-controlled device 10 in a coordinated manner, such that the user may not be aware that back-end system 20 is involved.

FIG. 4 shows an illustrative flow diagram of a sample process that may be used to configure a new audio-controlled device 10 in accordance with at least some of the embodiments described here. Process 400 begins at step 402. In step 404, a companion application is running on portable computing device 6 that causes the registration program to run and the message "Register New Echo" to be displayed on the screen of mobile device 6, as shown, and device 10 could ask "Are you ready to set me up?" Once user 2 either selects "Register New Echo" or responds to the audio question appropriately, in step 406, device 10 can send a request to computing device 6 seeking the requisite login information. In step 408, user 2 enters the login information into the application running on computing device 6 (it may be advantageous for increased security to require that the user physically enter the login information, rather than proceeding using audio instructions. Device 10, in step 410, uses the registration information to pair with user 2's preferred display screen, if that screen is available. Step 410 may require that device 10 seeks out the appropriate display screen using any of the methods described above, such as via Bluetooth or NFC communications, etc. For example, if a display screen is identified via Bluetooth, unique identifying information, such as a MAC address (essentially, a fixed serial number that can be used to identify an internet accessible device), regarding the display screen can be sent to back-end system 20 for further processing. Once the appropriate display screen is found, device 10 can request various pieces of information from the mobile computing device to ease future identification, such as the physical IP address of the computing device, which could then be stored in user 2's profile for future use. Once the appropriate display screen has been associated, process 400 ends at step 412, and both devices are accordingly registered to the account having the same USER ID (as shown in the example of FIG. 3, "FOOBAR").

Figure 5A:
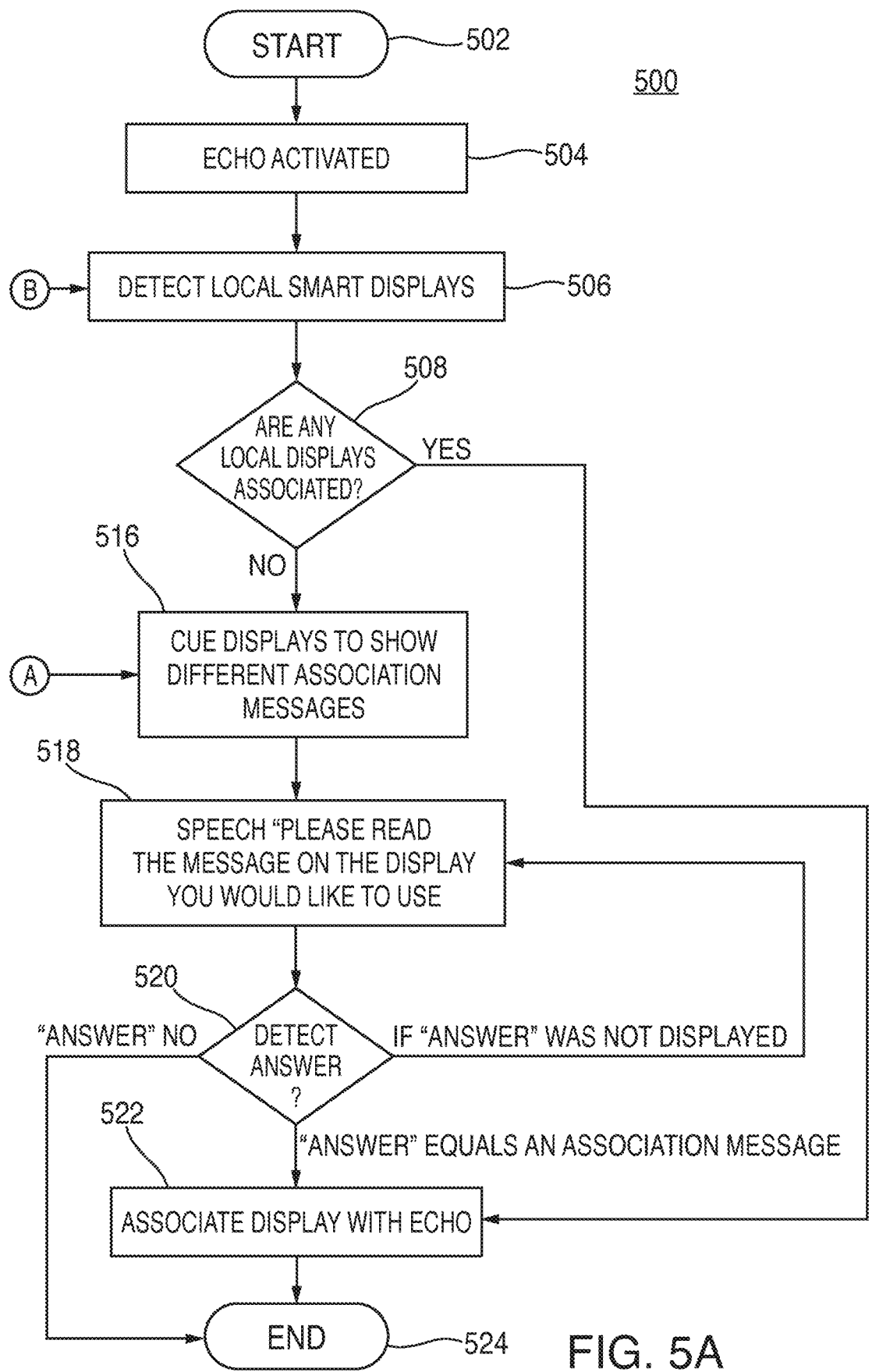
FIGS. 5A and 5B are flow diagrams of methods of associating a smart-screen with an audio-controlled computing device in accordance with embodiments of the present disclosure.
Figure 5B:
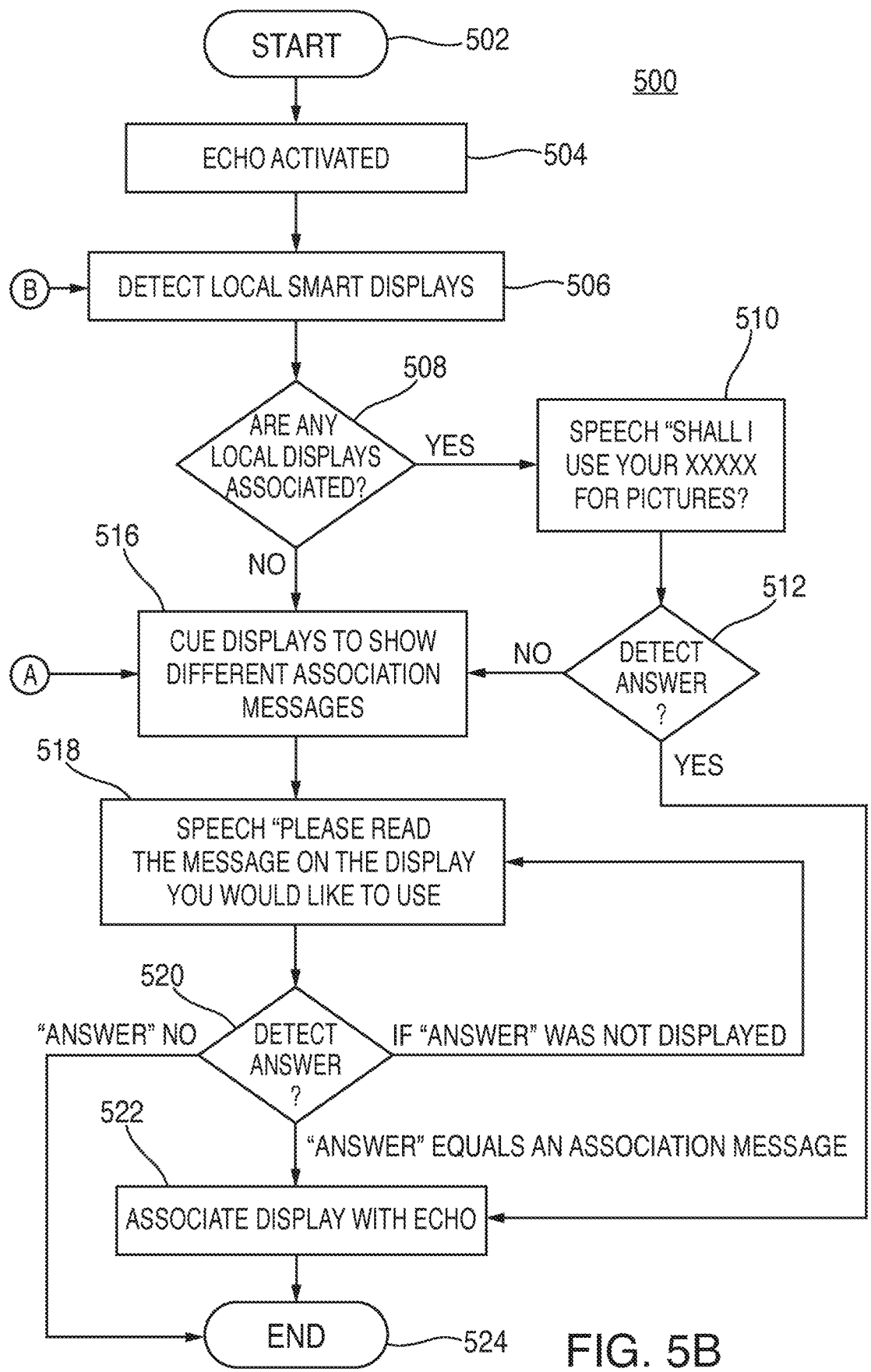

FIGS. 5A and 5B are illustrative flow diagrams of different versions of a sample process that may be used to associate a "smart" display screen with audio-controlled device 10 in accordance with at least some of the embodiments described here. "Smart" displays may include, for example, any display that is configured to be operated in a controlled manner such that content can vary depending on the circumstances (versus, for example, a "normal" TV that displays whatever content is provided to it by a broadcast network for a given channel). "Smart" displays may therefore include smartphones, tablet computers, interactive car dashboard displays, smart watches, etc. In each of these instances, a user can vary and control the content provided by the display based on the user's desires (e.g., if the user wants to know the weather in going to be Seattle at 12:32 pm on April 5th, that is what will be displayed if such information is available—such content cannot be accessed and controlled using "normal" displays). Process 500 begins at step 502 and ends at step 524. The embodiments differ depending on how process 500 continues from a positive response during step 508, as described below. In each instance, process 500 ultimately ends up at step 522, however, in the instance shown in FIG. 5A, a display is associated with the audio-controlled electronic device if a local display is detected that was previously associated, such as through the example shown and described with respect to FIG. 1A. In FIG. 5B, a slightly alternate process is shown in which the audio-controlled devices interacts with the user through a series of audio commands and user responses to seek permission to use the previously associated device.

In both examples (shown in FIG. 5A and 5B), audio-controlled device starts off in a stand-by state and is activated by the appropriate audio command in step 504. The example described with respect to process 500 may include the situation where device 10 attempts to pair with a smart display screen even prior to receiving any requests for information that might benefit from utilizing graphics in a response, or process 500 may be carried out in response to an inquiry where device 10 and/or system 10 or an application running on system 20 determines that the overall quality of the response may improve by including graphics information 26 in addition to text information 24. In either instance, in step 506, device 10 attempts to find out whether there are any smart display screens local to device 10 (i.e., which device 10 can communicate with directly). If any display screens are located, a query is performed in step 508 in order to determine whether any of those detected displays were previously associated with device 10. In the specific example shown in FIG. 5A, if a electronic device 10 detects locally a previously associated display, the process goes directly to step 522 and that display is associated with electronic device 10. In the alternate process shown in FIG. 5B, assuming at least one of the detected displays were previously associated, then, in step 510, device 10 asks the user: "Shall I use your XXXX screen to show you graphics when you ask me questions?" Device 10 then listens for an answer in step 512. In this case, device 10 seeks permission to use the previously associated display screen, rather than directly using it based on the previous permissions it has stored. The inquiry for permission continues when, if user 2 says "YES," device 10 reestablishes the associating between itself and the appropriate screen in step 522, and process 500 would end in step 524. On the other hand, if user 2 says "NO" meaning that user 2 does not want to use the normally preferred smart display screen.

As shown in FIGS. 5A and 5B, device 10 may assume that user 2 wishes to utilize a different smart display screen, so device 10 communicates with all of the locally accessible display screens and cues up different associating messages on each individual display in step 516. Once the individual messages have been transmitted in step 516, device 10 asks user 2 to "Please read the message on the display you would like to use" in step 518. Device 10 then, in step 520, returns to listening mode and waits for either an appropriate associating phrase or the word "NO" signifying that the user would prefer to remain in text-only communications mode. On the other hand, if user 2 provides one of the appropriate associating messages, device 10 carries out the steps to complete the association process in step 522 and process 500 ends in step 524.

Figure 6A:
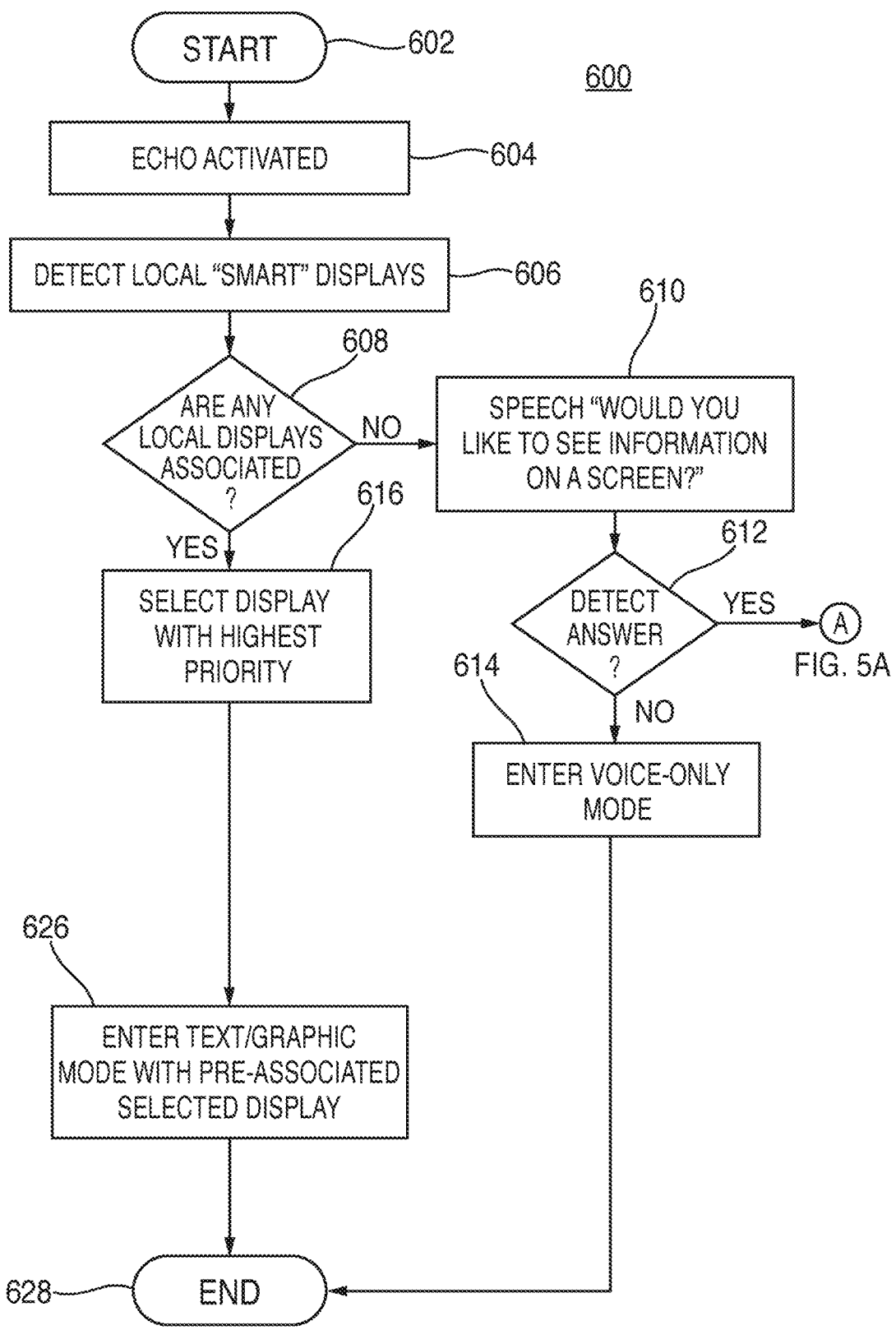
FIGS. 6A and 6B are flow diagrams of other methods of associating a smart-screen with an audio-controlled computing device in accordance with embodiments of the present disclosure.
Figure 6B:
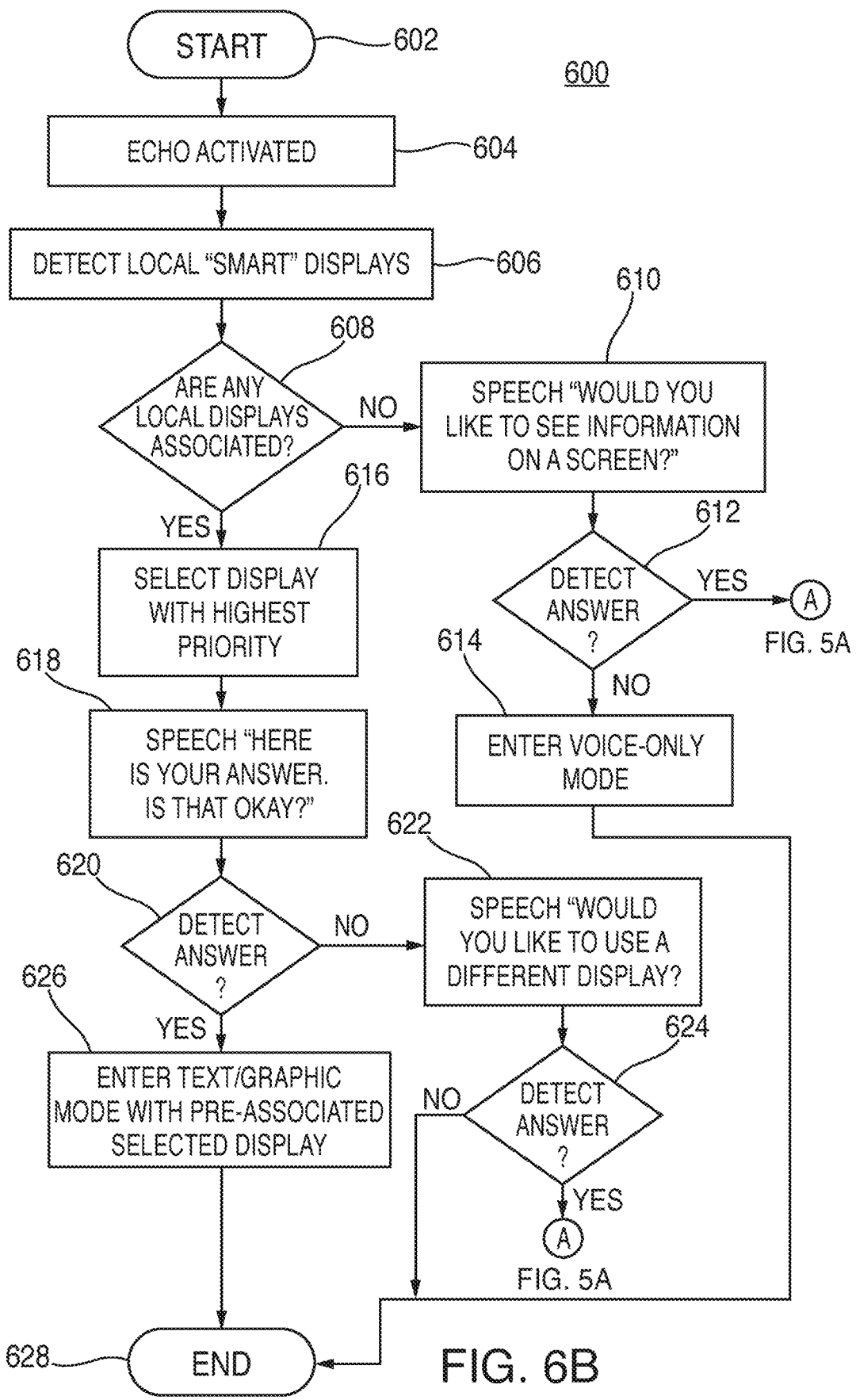

FIGS. 6A and 6B are similarly illustrative flow diagrams of slightly different embodiments of another sample process that may be used to pair a smart display screen with audio-controlled device 10 in accordance with at least some of the embodiments described here. Like the process differences between process 500 shown in FIGS. 5A and 5B, process 600 shown in FIGS. 6A and 6B varies depending on how much control the electronic device is given to manage the association process. For example, as shown in FIG. 6A, once electronic device 10 determines that at least one local display was associated and that the locally associated displays have been prioritized based on a preferred sequence of use, process 600 automatically pairs device 10 with the highest priority display screen available. The process shown in FIG. 6B, on the other hand, takes a more interactive approach through a series of steps that enables a user to switch to a different display screen regardless of the preset prioritization.

Process 600 may also include some of the steps previously described with respect to process 500 (as noted by reference designations "A" in a circle and "FIG. 5A" below that circle). Process 600 begins in step 602, and device 10 is activated from its monitoring mode in step 604 (device 10 generally remains in a standby state simply listening for the activation signal, which can be a simple name such as "Alexa" or "Amazon," at which time it begins to listen and analyze spoken speech). Once activated, in step 606, device 10 begins to try to detect whether and smart display screens are available locally that can be communicated with. Once one or more display screens have been located, in step 608, device 10 determines whether any of those display screens have been previously associated with device 10. If none of the detected displays have been previously associated with device 10, then device 10 asks "Would you like to see information on a screen as well" in step 610. If user 2 answers "YES," then control goes to step 516 in process 500 to attempt to figure out which display user 2 wishes to be connected. If user 2 answers "NO", device 10 enters voice-only mode in step 614, and process 600 ends in step 628.

If, on the other hand, at least one of the local displays has previously been associated with device 10 (as a result of the test set forth in step 608), a selection is made in step 616 that determines what priority exists in the user profile for the order in which different display screens should be accessed. In step 616, the selection will likely be made through system 20 via the communications previously described, and the display screen with the highest priority will be offered to the user. In step 618 (FIG. 6B only), device 10 provides an audio-based question: "Here is your answer, is that okay," referring to which display will be associated. In step 620 (FIG. 6B only) device 10 listens for the answer from user 2. If the answer is "NO," step 622 (FIG. 6B only) is carried out to offer user 2 the opportunity to use a different display. In step 624 (FIG. 6B only), device 10 again waits for an answer regarding the use of a different display. If the answer is again "NO," then device 10 operates in audio-only mode and process 600 ends at step 628. If the use of a different display is called from in step 624 (FIG. 6B only), control again returns to step 516 of process 500 to assist the user in utilizing a different display. On the other hand, if the response to inquiry 620 (FIG. 6B only) was that the selected display was acceptable, step 626 causes device 10 to enter combined text/graphic mode working with the pre-associated selected display (or if the process shown in FIG. 6A is followed), and process 600 again ends in step 628.

Figure 7:
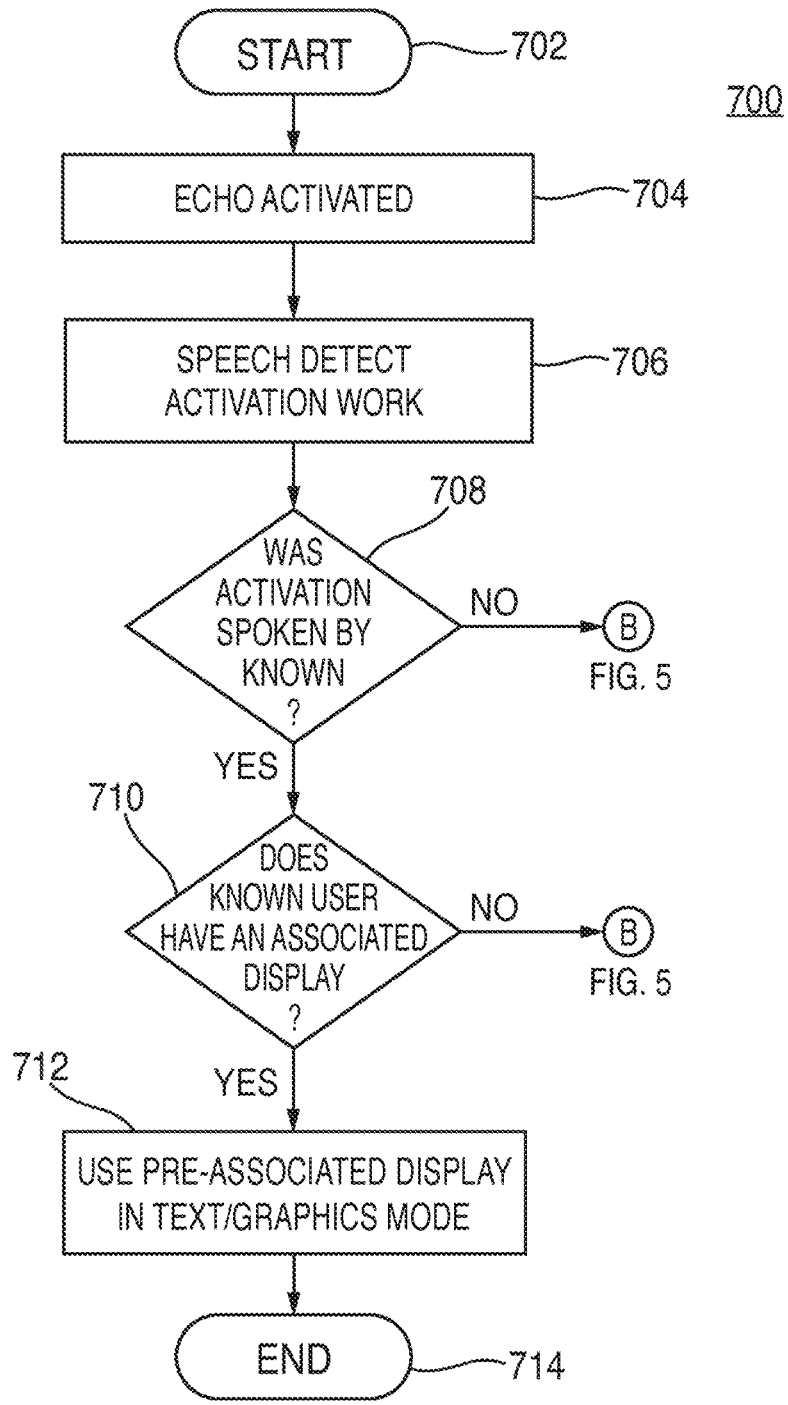
FIG. 7 is a flow diagram of a method of selecting a previously associated a smart-screen with an audio-controlled computing device in accordance with embodiments of the present disclosure.

FIG. 7 is an illustrative flow diagram of a sample process that may be used to pair a smart display screen with audio-controlled device 10 in accordance with at least some of the embodiments described here. Process 700 begins at step 702, assuming that device 10 is in a standby state. In step 704, device 10 is activated through the use of an audible key word, such as "Alexa." Once activated, in step 706, device 10 utilizes a speech detection application that may be running on system 20, for example. Accordingly, device 10 transmits the activation message it received to the speech detection application on system 20. The speech detection application can analyze the received audio signal and attempt to identify the individual who activated device 10 (the analysis may be performed simply on the wake up command, or it may be performed on the more content received from device 10. While the speech detection application is operating during step 706, device 10 waits for the answer at step 708.

If the answer to the inquiry is step 708 is that the identity of the user speaking could not be accomplished, control returns to step 506 in process 500 in order to determine whether associating will occur at all. On the other hand, if the individual is identified during step 706, process 700 continues from step 708 to step 710 to attempt to determine whether the identified user has a known smart display screen that has previously been associated. In order to determine the answer, it is likely that device 10 will again have to communicate with one or more portions of system 20, which may be used to store each individual users' profile. If the user has a preferred smart display screen that was previous associated with device 10, then step 712 occurs and device 10 is associated with the preferred display screen and process 700 ends at step 714.

FIG. 8 is an illustrative schematic diagram of a system for associating a voice-activated computing device with a smart screen computing device in accordance with embodiments of the present disclosure. FIG. 8 shows one example of previous described system 20 that includes various components and/or software applications or modules that can be included in a back-end system to support the routine operations of audio-controlled device 10. System 20 may include each of the components shown in FIG. 8, or it may include only some of the individual components described herein, or it may include additional components not described herein in combination with those described, but which still falls within the scope of the principles described herein. For example, system 20 may include a user profile application module 830 that can be used to compile and store user accounts for all of the individual devices 10 that interact with system 20. The information in application module 830 may be utilized to verify each attempt at logging into any of devices 10. Another application module that may be advantageous to include in system 20 may be speech detection module 832, which can be used to simply decipher the textual content spoken to device 10. A more advanced version of speech detect application 832 could be a subsystem that can identify individuals based on the commands spoken to device 10. System 20 could then apply both applications together to store identifiable audio tracks in a given user's profile that could greatly increase the probability of future successful identification occurring, thereby further improving the overall user experience.

Information application module 834 is also shown to be included within system 20. Information application module 834 can be one of the application modules that are used to respond to the various inquiries posed by user 2. Information application module 834 may itself, be broken into smaller sub-modules that could potentially be organized by subject matter in order to speed up the ability of system 20 to respond in a rapid and timely manner to information inquiries. For example, information application module 834 could have a sub-module dedicated to sports, which could be further broken down into local professional sports teams, non-local professional sports teams, individual sports, such as golf and tennis, etc. Another sub-application of information application module 834 could be food, which could itself be broken down in cooking/recipes and restaurants. There could be any number of sub-modules, which themselves could be broken down into further sub-groups without departing from the principles disclosed herein.

System 20, as shown in FIG. 8, also includes an OS messaging application module 836 for communicating with various mobile computing operating systems. For example, OS messaging application module 836 could be a single application, or it could be formed of a series individual sub-modules that are each dedicated to one and only one operating system. For example, application module 836 could be formed from four sub-modules including: Fire OS sub-module 836a, iOS sub-module 836b, Android OS sub-module 836c, and Windows OS sub-module 836d. Some of these various OS application modules may include a portion of common code that deals with certain events in the same manner, or each of the sub-modules may be stand-alone processes that are only activated when device 10 needs to communicate with a particular type of mobile computing device.

System 20 can be utilized by audio-controlled device 10 and computing device 6 in various manners to the benefit of users 2. For example, once a new device 10 is turned on, it may look for inputs from an application running on computing device 6, as part of the initialization process (particularly because device 10 is design with no input system other than audio inputs). In order for device 10 to work with computing device 6, the two devices will need to be associated together. This associating does not have to remain "permanent" and other computing devices can be associated with audio-controlled device 10 without departing from the spirit of the disclosures herein. For this initial associating, it may be possible for system 20 to cause the associating 802 to occur once user 2 provides the registration information that can include a pre-existing account. The login information, along with unique identifier information related to device 10 and computing device 6, such as the serial numbers and/or fixed IP addresses, can be provided to user profile application 830 via communications channel 804. This information will also include the fact that this individual device 10 has been associated with the individual computing device 6.

Once device 10 has been initialized, it goes into a constant standby state waiting to hear its activation word. When a wakeword word is made, and an inquiry request is made, the command and inquiry are passed to the speech detection application 832 via communications channel 806. Speech detection application 832 processes the received spoken text, and may optionally communicate with user profile application 830 in order to try to determine the identity of the speaker. In any case, once speech detection application 832 has determined what the spoken request was, it forms the request and sends that request to information application 834 via communications channel 808. Information application 834 processes the request and determines the format or formats for providing a response. These formats can include an audio-only response, a combined audio-graphics response and a graphics only response. If a graphics response is to be included, information application 834 communicates with OS messaging application 836 via communications channel 814 in order to insure that the response is properly formatted for the given computing device currently associated with audio-controlled device 10. Any further instructions or requests from OS messaging application 836 (including confirmation that the communication was successfully transmitted to computing device 6, are passed back to information application 834 via communications channel 820. OS messaging application 836 communicates to computing device 6 via communications channel 816 and receives information back from computing device 6 via communications channel 818.

The audio portion of the response to the information inquiry from user 2 is transmitted from information application 834 via communications channel 822 to speech detection application 832. Speech detection 832, in addition to breaking down the spoken speech from user 2, is also utilized to build the audio file that audio-controlled device plays back to user to in responding to the inquiry request. Speech detection application 832 then formats the informational response into spoken text and transmits that text back to audio-controlled device 10 as a digital audio file via communications channel 824. Audio-controlled device then plays back the digital file containing the response it received, while any graphics portion of the response is displayed on graphics computing device 6. An additional option for system 800 is that a communications channel also exists between user profile application 830 and information application 834. This channel may be used to attempt to prevent an improper individual from gaining access to information that person is not entitled to receive. For example, user application 830 could include a parental controls feature in order to attempt to limit the content that may be viewed by a child. Accordingly, prior to fulfilling a request for information, information application 834 can communicate with user profile application 830 via communications channel 812 to verify the identity of the requestor and to insure that the requestor is qualified to receive the requested information.

The various embodiments described herein may be implemented using a variety of means including, but not limited to, software, hardware, and/or a combination of software and hardware. Furthermore, the above-described embodiments are presented for the purposes of illustration and are not to be construed as limitations.

What is claimed is:

1. A system, comprising:
at least one processor; and
at least one memory comprising instructions that, when executed by the at least one processor, cause the system to:
receive first data representing a request to associate a first device and a second device, wherein:
the request is associated with a user profile;
the second device has a first hardware capability that is absent from the first device, and
the request to associate corresponds to the second device being a user preferred device to be used in response to an audio input to the first device requesting output of content requiring the first hardware capability;
based at least in part on the request to associate, store second data associating the first device and the second device, the second data representing the request to associate;
after storing the second data, receive audio data representing speech;
determine the audio data was received from the first device;
process the audio data to determine that the audio data represents a first request to output first content;
determine that the output of the first content requires the first hardware capability; and
based at least in part on determining the audio data was received from the first device, determining the output of the first content requires the first hardware capability, and the second data, cause the second device to display the first content using the first hardware capability.

2. The system of claim 1, wherein the speech is silent as to which device is to output the first content.

3. The system of claim 1, wherein the at least one memory further comprises instructions that, when executed by the at least one processor, further cause the system to:
after receiving the first data, cause the second device to display second content;
receive third data acknowledging the second content is being displayed by the second device; and
after receiving the third data, store the second data.

4. The system of claim 1, wherein the at least one memory further comprises instructions that, when executed by the at least one processor, further cause the system to:
cause the second device to display an image;
receive second audio data representing second speech;
perform speech processing on the second audio data to determine the second speech refers to the image; and
based at least in part on determining the second speech refers to the image, store the second data.

5. The system of claim 1, wherein the at least one memory further comprises instructions that, when executed by the at least one processor, further cause the system to:
cause the second device to display at least one word;
receive second audio data representing second speech;
perform speech processing on the second audio data to determine the second speech includes the at least one word; and
based at least in part on determining the second speech includes the at least one word, store the second data.

6. The system of claim 5, wherein the at least one memory further comprises instructions that, when executed by the at least one processor, further cause the system to:
cause a third device to display at least one second word while the second device is displaying the at least one word.

7. The system of claim 1, wherein the first device is a portable computing device and the at least one memory further comprises instructions that, when executed by the at least one processor, further cause the system to:
receive the first data from an application installed on the first device, the application being associated with a speech processing system remote from the first device.

8. The system of claim 1, wherein the at least one memory further comprises instructions that, when executed by the at least one processor, further cause the system to:
receive, from the first device, second audio data representing second speech;
perform speech processing on the second audio data to determine the second speech requests further content to be displayed using a different device;
cause a third device to display second content;
receive, from the first device, third audio data representing third speech;
perform speech processing on the third audio data to determine the third speech refers to the second content; and
store third data associating the first device and the third device, the third data causing the third device to be an active display device for the first device.

9. The system of claim 1, wherein the first data is second audio data representing second speech, the second audio data is received from the first device, the first device is a displayless device, and the at least one memory further comprises instructions that, when executed by the at least one processor, further cause the system to, prior to storing the second data:
determine the user profile is associated with the first device; and
determine, in the first user profile, an indicator of the second device.

10. The system of claim 1, wherein the first device is a displayless device and the at least one memory further comprises instructions that, when executed by the at least one processor, further cause the system to:
receive from the first device, an indicator of the second device, the first device receiving the indicator from the second device via a Bluetooth signal,
wherein the second data is stored based at least in part on receiving the indicator.

11. The system of claim 1, wherein the second device is associated with the first hardware capability and the first device is associated with a second hardware capability that is different from the first hardware capability.

12. A method, comprising:
receiving first data representing a request to associate a first device and a second device, wherein:
the request is associated with a user profile;
the second device has a first hardware capability that is absent from the first device, and
the request to associate corresponds to the second device being a user preferred device to be used in response to an audio input to the first device requesting output of content requiring the first hardware capability;
based at least in part on the request to associate, storing second data associating the first device and the second device, the second data representing the request to associate;
after storing the second data, receiving audio data representing speech;
determining the audio data was received from the first device;
processing the audio data to determine that the audio data represents a first request to output first content;
determining that the output of the first content requires the first hardware capability; and
based at least in part on determining the audio data was received from the first device, determining the output of the first content requires the first hardware capability, and the second data, causing the second device to display the first content using the first hardware capability.

13. The method of claim 12, wherein the speech is silent as to which device is to output the first content.

14. The method of claim 12, further comprising:
after receiving the first data, causing the second device to display second content;
receiving third data acknowledging the second content is being displayed by the second device; and
after receiving the third data, storing the second data.

15. The method of claim 12, further comprising:
causing the second device to display an image;
receiving second audio data representing second speech;
performing speech processing on the second audio data to determine the second speech refers to the image; and
based at least in part on determining the second speech refers to the image, storing the second data.

16. The method of claim 12, further comprising:
causing the second device to display at least one word;
receiving second audio data representing second speech;
performing speech processing on the second audio data to determine the second speech includes the at least one word; and based at least in part on determining the second speech includes the at least one word, storing the second data.

17. The method of claim 16, further comprising:
causing a third device to display at least one second word while the second device is displaying the at least one word.

18. The method of claim 12, wherein the first device is a portable computing device and the method further comprises:
receiving the first data from an application installed on the first device, the application being associated with a speech processing system remote from the first device.

19. The method of claim 12, further comprising:
receiving, from the first device, second audio data representing second speech;
performing speech processing on the second audio data to determine the second speech requests further content to be displayed using a different device;
causing a third device to display second content;
receiving, from the first device, third audio data representing third speech;
performing speech processing on the third audio data to determine the third speech refers to the second content; and
storing third data associating the first device and the third device, the third data causing the third device to be an active display device for the first device.

20. The method of claim 12, wherein the first data is second audio data representing second speech, the second audio data is received from the first device, the first device is a displayless device, and the method further comprises:
determining the user profile is associated with the first device; and
determining, in the first user profile, an indicator of the second device.

21. The method of claim 12, wherein the first device is a displayless device and the method further comprises:
receiving from the first device, an indicator of the second device, the first device receiving the indicator from the second device via a Bluetooth signal,
wherein the second data is stored based at least in part on receiving the indicator.

\* \* \* \* \*